(12) United States Patent
Yan

(10) Patent No.: US 11,004,179 B2
(45) Date of Patent: May 11, 2021

(54) IMAGE BLURRING METHODS AND APPARATUSES, STORAGE MEDIA, AND ELECTRONIC DEVICES

(71) Applicant: Shenzhen SenseTime Technology Co., Ltd., Guangdong (CN)

(72) Inventor: Qiong Yan, Guangdong (CN)

(73) Assignee: SHENZHEN SENSETIME TECHNOLOGY CO., LTD., Guangdong (CN)

( * ) Notice: Subject to any disclaimer, the term of this patent is extended or adjusted under 35 U.S.C. 154(b) by 139 days.

(21) Appl. No.: 16/233,671

(22) Filed: Dec. 27, 2018

(65) Prior Publication Data
US 2019/0130536 A1    May 2, 2019

Related U.S. Application Data

(63) Continuation of application No. PCT/CN2018/087322, filed on May 17, 2018.

(30) Foreign Application Priority Data

May 19, 2017 (CN) .......................... 201710358741.0

(51) Int. Cl.
*G06T 5/20* (2006.01)
*G06T 5/00* (2006.01)
(Continued)

(52) U.S. Cl.
CPC ............. *G06T 5/002* (2013.01); *G06T 5/20* (2013.01); *G06T 5/50* (2013.01); *G06T 7/571* (2017.01);
(Continued)

(58) Field of Classification Search
CPC ................ G06T 5/002; G06T 5/20; G06T 2207/20024–2207/20032; G06T 2207/20101; G06T 7/194
See application file for complete search history.

(56) References Cited

U.S. PATENT DOCUMENTS

| 8,391,627 | B1 * | 3/2013 | Worthington | ............. | G06T 5/20 |
| | | | | | 382/260 |
| 2013/0033582 | A1 * | 2/2013 | Sun | ...................... | H04N 13/271 |
| | | | | | 348/47 |

(Continued)

FOREIGN PATENT DOCUMENTS

| CN | 103945118 A | 7/2014 |
| CN | 106530241 A | 3/2017 |
| KR | 20140136138 A | 11/2014 |

OTHER PUBLICATIONS

International Search Report on International application No. PCT/CN2018/087322, dated Aug. 14, 2018, 6 pages.
(Continued)

*Primary Examiner* — Brian Werner
(74) *Attorney, Agent, or Firm* — Reising Ethington P.C.

(57) ABSTRACT

Image blurring methods and apparatuses, storage media, and electronic devices. The method can be carried out by the apparatuses, media and devices, and includes: generating a second image having second pixel points corresponding to first pixel points of a first image; determining, according to blurring desired data of the first pixel points, respective initial blurring weight values of the corresponding second pixel points; performing at least one update on at least one of the second pixel points, the update including: updating, based on a first pixel value of the first pixel point and a current blurring weight value of the second pixel point corresponding to the based first pixel point, a current pixel value and a current blurring weight value of at least one (Continued)

neighboring second pixel point of the based corresponding second pixel point; and obtaining a blurring result of the first image according to the updated second image.

17 Claims, 6 Drawing Sheets

(51) Int. Cl.
    *G06T 7/571*     (2017.01)
    *G06T 5/50*     (2006.01)

(52) U.S. Cl.
    CPC ............... *G06T 2207/10028* (2013.01); *G06T 2207/20221* (2013.01)

(56) References Cited

U.S. PATENT DOCUMENTS

2015/0264271 A1     9/2015     Yang et al.
2017/0270644 A1*     9/2017     Zhao ...................... G06T 11/60

OTHER PUBLICATIONS

Written Opinion on International application No. PCT/CN2018/087322, dated Aug. 14, 2018, 4 pages.

* cited by examiner

IMAGE BLURRING METHODS AND APPARATUSES, STORAGE MEDIA, AND ELECTRONIC DEVICES

CROSS-REFERENCE TO RELATED APPLICATIONS

The present application is a continuation of International Application No. PCT/CN2018/087322, filed on May 17, 2018, which claims priority to Chinese Patent Application No. CN201710358741.0, filed with the Chinese Patent Office on May 19, 2017, and entitled "IMAGE BLURRING METHODS AND APPARATUSES, STORAGE MEDIA, AND ELECTRONIC DEVICES". Both of the aforementioned applications are incorporated herein by reference in their entirety.

TECHNICAL FIELD

Embodiments of the present disclosure relate to image processing technologies, and in particular, to image blurring methods and apparatuses, storage media, and electronic devices.

BACKGROUND

Background blurring of images can enable photography subjects to be displayed clearly, and is popular with photography enthusiasts. For now, an image blurring effect is mainly achieved by using an optical imaging principle, i.e., using a large lens aperture for implementation on hardware. Therefore, the image blurring function is mainly integrated on professional cameras such as a single-lens reflex camera. With the increasing popularity of smart phones, most users use mobile phones to take photos. However, due to the limit of the thickness of a mobile phone, only the small-aperture lens can be installed in the mobile phone, and thus the mobile phone can only generate a weak blurring effect in the case of a close distance, but no image with the blurring effect can be generated in other scenes.

SUMMARY

Embodiments of the present disclosure provide technical solutions of image blurring.

According to one aspect of the embodiments of the present disclosure, an image blurring method is provided, and includes: generating a second image including second pixel points, the second pixel points corresponding to first pixel points of a first image to be processed and having second pixel values being initial values; determining, according to blurring desired data of the first pixel points in the first image, respective initial blurring weight values of the corresponding second pixel points; performing at least one update on at least one of the second pixel points of the second image, the update including: updating, based on a first pixel value of the first pixel point and a current blurring weight value of the second pixel point corresponding to the based first pixel point, a current pixel value and a current blurring weight value of at least one neighboring second pixel point of the based corresponding second pixel point; and obtaining a blurring result of the first image according to the updated second image.

According to one or more embodiments of the present disclosure, a distance between the neighboring second pixel point and the based corresponding second pixel point meets a set requirement.

According to one or more embodiments of the present disclosure, the blurring desired data of the first pixel point includes: a blurring radius; and a distance between the neighboring second pixel point and the based corresponding second pixel point meeting a set requirement includes: the distance between the neighboring second pixel point and the based corresponding second pixel point is smaller than or equal to the blurring radius.

According to one or more embodiments of the present disclosure, the obtaining a blurring result of the first image according to the updated second image includes: normalizing, according to a current pixel value and a current blurring weight value of each second pixel point in the updated second image, the pixel value of each second pixel point in the second image, and using the normalized second image as the blurring result.

According to one or more embodiments of the present disclosure, the method further includes: acquiring depth data corresponding to the first image; and acquiring the blurring desired data of each first pixel point in the first image according to the depth data.

According to one or more embodiments of the present disclosure, the acquiring the blurring desired data of each first pixel point in the first image according to the depth data includes: determining a depth difference value between each first pixel point in the first image and a predetermined focusing point in the first image according to the depth data; and determining the blurring desired data of each first pixel point according to each depth difference value respectively.

According to one or more embodiments of the present disclosure, before determining the depth difference value between each first pixel point and the predetermined focusing point in the first image according to the depth data, the method further includes: acquiring input focusing point information.

According to one or more embodiments of the present disclosure, before acquiring the blurring desired data of each first pixel point in the first image according to the depth data, the method further includes: de-noising the depth data.

According to one or more embodiments of the present disclosure, the first image is a main image obtained by photographing the same object with a dual-lens camera; and the de-noising the depth data includes: obtaining the depth data and depth confidence degree data according to the main image and a secondary image obtained by photographing the same object with the dual-lens camera, the depth data indicating depth values of corresponding pixel points in the main image and the secondary image, and the depth confidence degree data indicating confidence degrees of the depth values in the depth data; and correcting at least one depth value in the depth data according to the depth confidence degree data.

According to one or more embodiments of the present disclosure, the obtaining depth confidence degree data according to the main image and a secondary image obtained by photographing the same object with the dual-lens camera includes: if the corresponding pixel points in the main image and the secondary image have the same depth value, assigning a depth confidence degree value greater than a reference value to the corresponding pixel points; and/or, if the depth value of the pixel points in the main image exceeds a preset range, assigning a depth confidence degree value smaller than the reference value to the pixel points exceeding the preset range; and/or, if the pixel points in the main image have two or more depth values, assigning depth confidence degree values smaller than the reference value to the pixel points having two or more depth values.

According to one or more embodiments of the present disclosure, the correcting at least one depth value in the depth data according to the depth confidence degree data includes: replacing the depth value of a pixel point having the minimum depth confidence degree value with the depth value of a neighboring pixel point having the maximum depth confidence degree value.

According to one or more embodiments of the present disclosure, the de-noising the depth data further includes: filtering the depth data by using a filter; and/or, increasing the depth values in the depth data according to a preset proportion.

According to one or more embodiments of the present disclosure, the obtaining the depth data according to the main image and a secondary image obtained by photographing the same object with the dual-lens camera includes: performing stereo matching on the main image and the secondary image to obtain initial depth data; and performing depth calibration on the initial depth data to position the corresponding pixel points of the main image and the secondary image at the same depth to obtain the depth data.

According to another aspect of the embodiments of the present disclosure, an image blurring apparatus is also provided, and includes: a processor, and a memory storing instructions, wherein the instructions, when executed by the processor, cause the processor to perform operations, the operations including generating a second image including second pixel points, the second pixel points corresponding to first pixel points of a first image to be processed and having second pixel values being initial values; determining, according to blurring desired data of the first pixel points in the first image, respective initial blurring weight values of the corresponding second pixel points; performing at least one update on at least one of the second pixel points of the second image, the update including: updating, based on a first pixel value of the first pixel point and a current blurring weight value of the second pixel point corresponding to the based first pixel point, a current pixel value and a current blurring weight value of at least one neighboring second pixel point of the based corresponding second pixel point; and obtaining a blurring result of the first image according to the updated second image.

According to one or more embodiments of the present disclosure, a distance between the neighboring second pixel point and the based corresponding second pixel point meets a set requirement.

According to one or more embodiments of the present disclosure, the blurring desired data of the first pixel point includes: a blurring radius; and a distance between the neighboring second pixel point and the based corresponding second pixel point meeting a set requirement includes: the distance between the neighboring second pixel point and the based corresponding second pixel point is smaller than or equal to the blurring radius.

According to one or more embodiments of the present disclosure, the obtaining a blurring result of the first image according to the updated second image includes: normalizing, according to a current pixel value and a current blurring weight value of each second pixel point in the updated second image, the pixel value of each second pixel point in the second image, and using the normalized second image as the blurring result.

According to one or more embodiments of the present disclosure, the operations further including: acquiring depth data corresponding to the first image; and acquiring the blurring desired data of each first pixel point in the first image according to the depth data.

According to one or more embodiments of the present disclosure, the acquiring the blurring desired data of each first pixel point in the first image according to the depth data includes: determining a depth difference value between each first pixel point in the first image and a predetermined focusing point in the first image according to the depth data; and determining the blurring desired data of each first pixel point according to each depth difference value respectively.

According to one or more embodiments of the present disclosure, the operations further include: before determining the depth difference value between each first pixel point and the predetermined focusing point in the first image according to the depth data, acquiring input focusing point information; and before acquiring the blurring desired data of each first pixel point in the first image according to the depth data, de-noising the depth data, wherein the first image is a main image obtained by photographing the same object with dual cameras; and the de-noising the depth data includes; obtaining the depth data and depth confidence degree data according to the main image and a secondary image obtained by photographing the same object with the dual cameras, the depth data indicating depth values of corresponding pixel points in the main image and the secondary image, and the depth confidence degree data indicating confidence degrees of the depth values in the depth data; and correcting at least one depth value in the depth data according to the depth confidence degree data.

According to one or more embodiments of the present disclosure, the obtaining depth confidence degree data according to the main image and a secondary image obtained by photographing the same object with the dual cameras includes, if the corresponding pixel points in the main image and the secondary image have the same depth value, assigning a depth confidence degree value greater than a reference value to the corresponding pixel points; and/or, if the depth value of the pixel points in the main image exceeds a preset range, assigning a depth confidence degree value smaller than the reference value to the pixel points exceeding the preset range; and/or, if the pixel points in the main image have two or more depth values, assigning depth confidence degree values smaller than the reference value to the pixel points having two or more depth values.

According to one or more embodiments of the present disclosure, the correcting at least one depth value in the depth data according to the depth confidence degree data includes replacing the depth value of a pixel point having the minimum depth confidence degree value with the depth value of a neighboring pixel point having the maximum depth confidence degree value.

According to one or more embodiments of the present disclosure, the de-noising the depth data further includes: filtering the depth data by using a filter; and/or, increasing the depth values in the depth data according to a preset proportion.

According to one or more embodiments of the present disclosure, the obtaining the depth data according to the main image and a secondary image obtained by photographing the same object with the dual-lens camera includes: performing stereo matching on the main image and the secondary image to obtain initial depth data; and performing depth calibration on the initial depth data to position the corresponding pixel points of the main image and the secondary image at the same depth to obtain the depth data.

According to still another aspect of the embodiments of the present disclosure, a non-transitory storage medium is also provided, and stores at least one executable instruction, where the executable instruction is adapted to be loaded by a processor and execute operations corresponding to the image blurring method according to any one of the foregoing embodiments.

According to yet another aspect of the embodiments of the present disclosure, a computer program is also provided, and includes a computer-readable code, where when the computer-readable code runs in a device, a processor in the device executes instructions for implementing the image blurring method according to any one of the foregoing embodiments.

According to the image blurring methods and apparatuses, the storage media, and the electronic devices of the embodiments of the present disclosure, by generating, for a first image to be processed, a second image having corresponding pixel values, determining blurring weight values of pixel points in the second image according to blurring desired data of the first image, performing cumulative update on the pixel values and the blurring weight values of the pixel points in the second image, and determining a blurring result of the first image according to the update result to simulate the blurring process of a large-aperture lens, the blurring of the first image is implemented and the first image can yield an obvious blurring effect.

The following further describes in detail the technical solutions of the present disclosure with reference to the accompanying drawings and embodiments.

BRIEF DESCRIPTION OF THE DRAWINGS

The accompanying drawings constituting a part of the specification are used for describing embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION OF EMBODIMENTS

Figure 1:
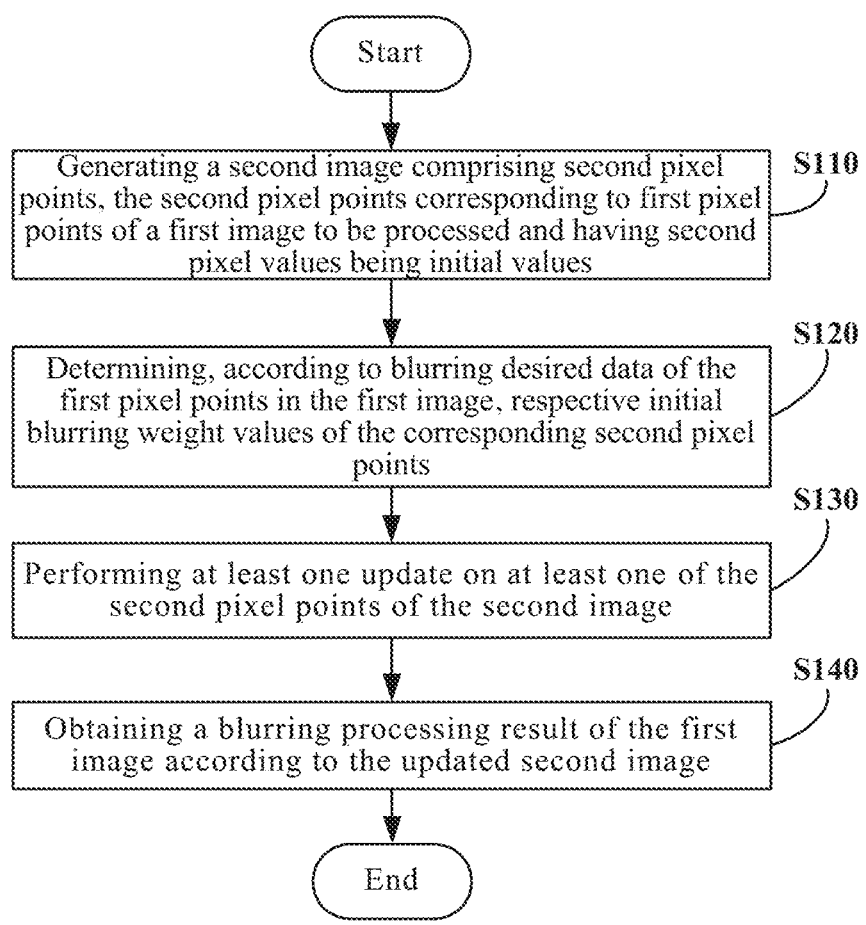
FIG. 1 is a flowchart of an image blurring method according to an embodiment of the present disclosure.

The implementations of the embodiments of the present disclosure are further described in detail below with reference to the accompanying drawings (the same reference numerals in a plurality of accompanying drawings represent the same elements) and the embodiments. The following embodiments are intended to illustrate the present disclosure, but are not intended to limit the scope of the present disclosure.

Persons skilled in the art can understand that the terms "first", "second" and the like in the embodiments of the present disclosure are only used to distinguish different steps, devices or modules, etc., and do not represent any specific technical meaning or inevitable logical sequence therebetween.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the disclosures or uses thereof.

Technologies, methods and devices known to persons of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (such as, program modules) executed by the computer system. Generally, the program modules may include routines, programs, target programs, assemblies, logics, data structures, and the like, to perform specific tasks or implement specific abstract data types. The computer system/server may be practiced in the distributed cloud computing environments in which tasks are performed by remote processing devices that are linked through a communications network. In the distributed computing environments, program modules may be located in local or remote computing system storage media including storage devices.

FIG. 1 is a flowchart of an image blurring method according to an embodiment of the present disclosure.

Referring to FIG. 1, in step S110, a second image of which pixel points correspond to those of a first image to be processed and pixel values are initial values is generated.

In the embodiments of the present disclosure, the first image to be processed may be any image, for example, includes, but is not limited to, an image photographed by an ordinary camera or a dual-lens camera. That is, the image blurring method of this embodiment can be used for blurring and rendering any image.

After the first image to be processed is acquired, the second image of which the pixel points have one-to-one correspondence to first pixel points in the first image is generated, and pixel values of the second pixel points in the second image are initialized to be the same initial value, for example, the initial value is 0 or a certain identical value. Here, the size of the second image may be identical to that of the first image.

In an optional example, the operation S110 may be performed by a processor by invoking a corresponding instruction stored in a memory, and may also be performed by a generating module 310 run by the processor.

In step S120, according to blurring desired data of each first pixel point in the first image, an initial blurring weight value of the corresponding pixel point is separately determined.

Before the step is performed, the blurring desired data of each first pixel point in the first image is acquired, for use to indicate a desired or intended blurring degree after blurring each first pixel point in the first image. Here the blurring desired data includes, but is not limited to, a blurring radius length or diameter length, etc. and the blurring diameter length may include, but is not limited to, a radius, a diameter, or other information of a circle of confusion of the blurred pixels.

In this embodiment, according to the acquired blurring desired data of each first pixel point in the first image, an initial blurring weight value is determined for each corresponding second pixel point in the second image, so as to simulate the blurring process of a lens having a large aperture (such as a single-lens reflex camera) during imaging to blur and render the first image.

In an optional example, the operation S120 may be performed by a processor by invoking a corresponding instruction stored in a memory, and may also be performed by a determining module 320 run by the processor.

In step S130, at least one update is performed on at least one second pixel point of the second image.

The update includes: updating, according to a pixel value of a first pixel point and a current blurring weight value of a second pixel point corresponding to the first pixel point, a current pixel value and a current blurring weight value of at least one neighboring second pixel point of the corresponding second pixel point.

In an optional implementation, the pixel value of each first pixel point is acquired, and the current blurring weight value of each corresponding second pixel point is acquired, and a scattering operation is performed on each corresponding second pixel point, for use to update current pixel values and current blurring weight values of other second pixel points neighboring to the corresponding second pixel point. Here, each second pixel point may correspond to at least one neighboring second pixel point, and the scattering operation for each second pixel point may enable at least one neighboring second pixel point to be updated once; and accordingly, for each second pixel point, the scattering operation of at least one neighboring second pixel point can be received and at least one update is performed. It should be noted here that if a second pixel point is updated for the first time, the update is performed on the basis of the initial pixel value and the initial blurring weighting value, and if a second pixel point is updated for the second time, a cumulative update is performed on the basis of the current pixel value and the current blurring weight value.

According to one or more embodiments of the present disclosure, during update of each second pixel point in the second image, if all the pixel points in the second image have been updated, the update of the second image can be stopped, and the next step is performed for further processing. Alternatively, if all other second pixel points neighboring to the corresponding second pixel point for each first pixel point needing to be blurred in the first image have been updated, the update of the second image can be stopped. A first pixel point needing to be blurred in the first image can be determined according to the blurring desired data of the first pixel point.

In an optional example, the operation S130 may be performed by a processor by invoking a corresponding instruction stored in a memory, and may also be performed by an updating module 330 run by the processor.

In step S140, a blurring result of the first image is obtained according to the updated second image.

According to one or more embodiments of the present disclosure, after the update of the second image is stopped, the pixel value of each second pixel point in the second image is determined according to the current pixel value and the current blurring weighting value of each second pixel point in the updated second image. The determined pixel value of each second pixel point can indicate the color and/or brightness, etc. of the desired blurring effect of the corresponding first pixel point, that is, the updated second image serves as the blurring result of the first image.

In an optional example, the operation S140 may be performed by a processor by invoking a corresponding instruction stored in a memory, and may also be performed by a blurring module 340 run by the processor.

According to the image blurring method of the embodiments of the present disclosure, by generating, for a first image to be processed, a second image having corresponding pixel values, determining blurring weight values of pixel points in the second image according to blurring desired data of the first image, performing cumulative update on the pixel values and the blurring weight values of the pixel points in the second image, and determining a blurring result of the first image according to the update result to simulate the blurring process of a large-aperture lens, the blurring of the first image is implemented and the first image can yield an obvious blurring effect.

In practical disclosures, the image blurring method of this embodiment can be implemented by a camera, image processing programs, or an intelligent terminal having a camera function, etc. However, persons skilled in the art should know that: in practical disclosures, any device that has a corresponding image processing and data processing function can perform the image blurring method of the embodiments of the present disclosure with reference to this embodiment.

Figure 2:
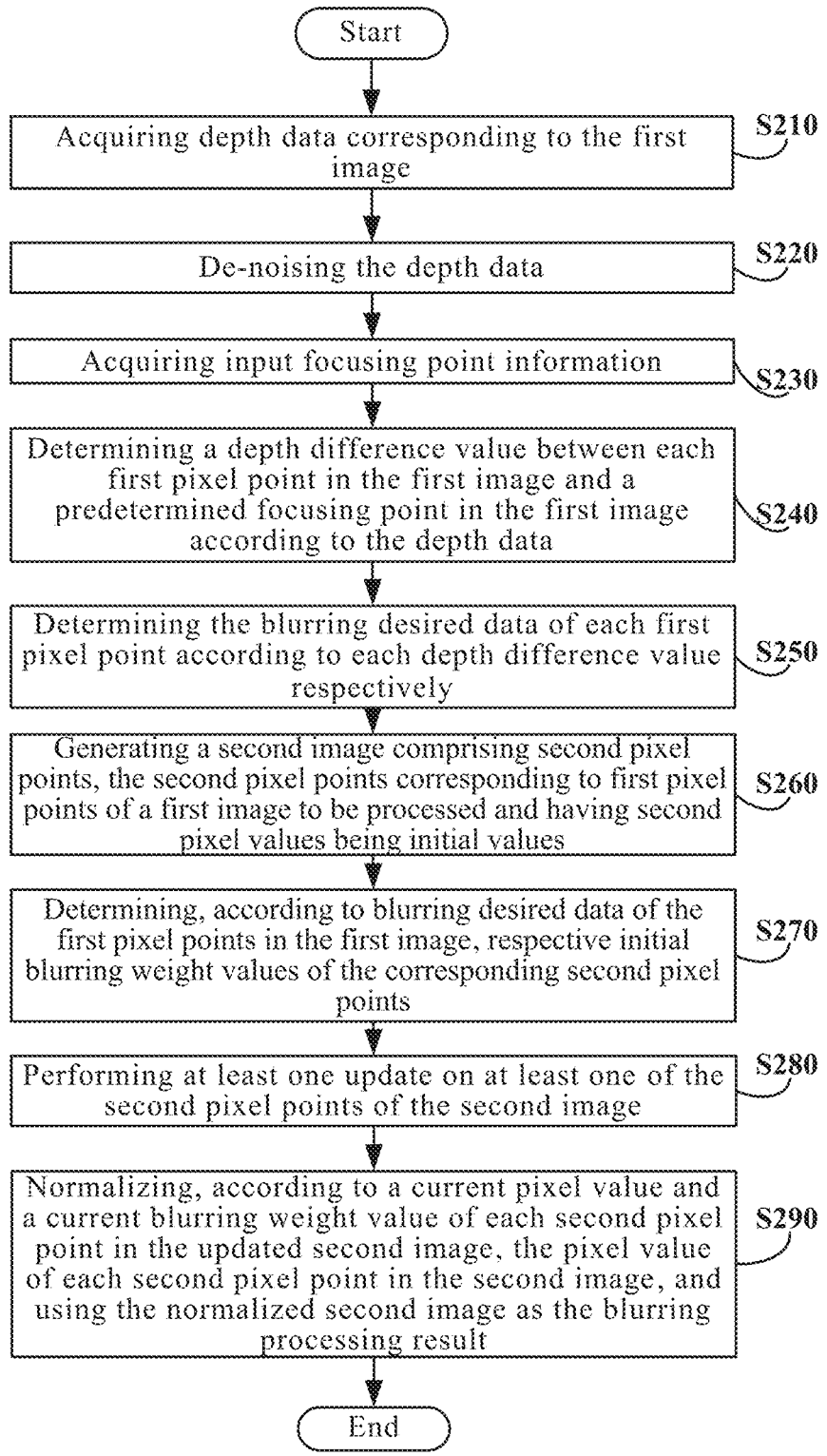
FIG. 2 is a flowchart of an image blurring method according to another embodiment of the present disclosure.

FIG. 2 is a flowchart of an image blurring method according to another embodiment of the present disclosure.

Referring to FIG. 2, in step S210, depth data corresponding to the first image is acquired.

In the embodiments of the present disclosure, the first image to be processed may be an image photographed by any camera, and the image blurring method of the embodiments of the present disclosure can blur and render the image photographed by any camera.

Figure 3:
FIG. 3 is a main image photographed by a dual-lens camera provided according to another embodiment of the present disclosure.
Figure 4:
FIG. 4 is a secondary image photographed by a dual-lens camera provided according to another embodiment of the present disclosure.

This embodiment is described by taking the images photographed by a dual-lens camera as an example, for example, the main image obtained by photographing the same object with the dual-lens camera is used as the first image. Two pictures, i.e., the main image and the secondary image (or a left image and a right image), are obtained by photographing the same object with the dual-lens camera; and which one of the two pictures is used as the main image and which one is used as the secondary image can be determined in the way set before the dual-lens camera leaves the factory. Referring to the main image in FIG. 3 and the secondary image in FIG. 4, the main image and the secondary image are two pictures obtained by photographing the same scene by the dual-lens camera at different angles, for example, the positions of ears of toy dolls close to edges of the pictures in the main image and the secondary image are different (the positions relative to a mouse pad on the top of a table are different).

In an optional implementation, the depth data is obtained according to the main image and the secondary image obtained by photographing the same object with the dual-lens camera. The depth data indicates depth vales of the corresponding pixel points in the main image and the secondary image. According to one or more embodiments of the present disclosure, after the main image and the secondary image are acquired, initial depth data is obtained by performing stereo matching on the main image and the secondary image. Furthermore, depth calibration is performed on the initial depth data to position the corresponding pixel points of the main image and the secondary image at the same depth so as to acquire the depth data of the main image and the secondary image. It should be noted here that the method for acquiring the depth data corresponding to the main image is not limited thereto. No limitation is made thereto in this embodiment. For example, in other embodiments, during the blurring of an image photographed by an ordinary camera, the depth data of the image can be acquired by means of a deep neural network.

In an optional example, the operation S210 may be performed by a processor by invoking a corresponding instruction stored in a memory, and may also be performed by a first acquiring module 350 run by the processor.

In step S220, the depth data is de-noised.

Figure 5:
FIG. 5 is a depth image of a main image provided according to another embodiment of the present disclosure.

In this embodiment, when the depth data is obtained according to the main image and the secondary image obtained by photographing the same object with the dual-lens camera, depth confidence degree data is also acquired, and the depth data is de-noised according to the depth confidence degree data. Here, the depth confidence degree data indicates confidence degrees of the depth values in the depth data, and at least one depth value in the depth data can be corrected according to the depth confidence degree data, such that the depth values indicated by the depth data are more accurate. According to one or more embodiments of the present disclosure, the depth data and the depth confidence degree data are respectively a depth image and a depth confidence degree image having the same sizes as those of the main image and the secondary image. Referring to the depth image of the main image in FIG. 5, the value of each pixel point in the depth image represents a depth value of the corresponding pixel point in the main image. The value of each pixel point in the corresponding depth confidence degree image (not shown) of the main image represents a confidence degree of the depth value of the corresponding pixel point.

When the depth confidence degree data is acquired, the corresponding depth confidence degree data is determined according to the depth data of the main image and the secondary image. For example, if the corresponding pixel points in the main image and the secondary image have the same depth value, a depth confidence degree value greater than a reference value is assigned to the depth values of the corresponding pixel points, and if the corresponding pixel points in the main image and the secondary image have different depth values, depth confidence degree values smaller than the reference value are assigned to the depth values of the corresponding pixel points; and/or, if the depth value of the pixel points in the main image exceeds a preset range, a depth confidence degree value smaller than the reference value is assigned to the depth value of the pixel points exceeding the preset range, and if the depth value of the pixel points in the main image does not exceed the preset range, a depth confidence degree value greater than the reference value is assigned to the depth value of the pixel points; and/or, if the pixel points in the main image have two or more depth values, depth confidence degree values smaller than the reference value are assigned to the depth values of the pixel points having two or more depth values; and if the pixel points in the main image have the same depth value, a depth confidence degree value greater than the reference value is assigned to the depth value of the corresponding pixel points.

According to one or more embodiments of the present disclosure, when the depth data of the main image is corrected according to the corresponding depth confidence degree data of the main image, the depth value of a pixel point having the minimum depth confidence degree value is replaced with the depth value of a neighboring pixel point having the maximum depth confidence degree value, so as to avoid a large error that may occur in the depth values determined for the pixel points in the main image and improve the accuracy of the depth data.

In addition, during the de-noising of the depth data, the depth data can further be filtered by using a filter. For example, a smoothing filter is used so that the pixel points with similar colors in the main image have similar depth values, and thus the accuracy of the depth data is further improved; and the depth values in the depth data are increased according to a preset proportion, that is, stretching processing is performed on the depth values in the depth data to increase the contrast among the depth values of the pixel points.

In an optional example, the operation S220 may be performed by a processor by invoking a corresponding instruction stored in a memory, and may also be performed by a de-noising module 370 run by the processor.

In step S230, input focusing point information is acquired.

In this embodiment, the focusing point information of the first image (the main image as described above) is acquired by means of input. During the blurring of the photographed first image, a user can select and click a point or area in the first image, or input coordinates or other data of a point or area in the first image and use the point or area as the focusing point or focusing area of the first image. For example, if the first image includes a person and a vehicle, the user can click the person as the focusing point; by implementing the image blurring method of this embodiment, the person in the first image is displayed more clearly, and the vehicle and other background areas in the first image are displayed less clearly.

Certainly, in other embodiments, in the case that the user has selected a focusing point when photographing the first image, information of the determined focusing points in the first image can also be directly acquired during execution of the step, where the focusing point selected by the user may be a focusing point selected during autofocusing of the camera when the user photographs the first image.

In an optional example, the operation S230 may be performed by a processor by invoking a corresponding instruction stored in a memory, and may also be performed by a first acquiring unit 363 in a second acquiring module 360 run by the processor.

In step S240, a depth difference value between each first pixel point in the first image and a predetermined focusing point in the first image is determined according to the depth data.

The predetermined focusing point in the first image is determined according to the acquired focusing point information; the depth values of each first pixel point and the predetermined focusing point in the first image are acquired according to the de-noised depth data; and a difference value between the depth values of each first pixel point and the predetermined focusing point is calculated.

In an optional example, the operation S240 may be performed by a processor by invoking a corresponding instruction stored in a memory, and may also be performed by a first determining unit 361 in the second acquiring module 360 run by the processor.

In step S250, the blurring desired data of each first pixel point is separately determined according to each depth difference value.

In this embodiment, the blurring desired data of each first pixel point is calculated according to the depth difference value between each first pixel point and the predetermined focusing point in the first image.

According to one or more embodiments of the present disclosure, the blurring desired data of a first pixel point includes the blurring radius. For example, the blurring radius c of a first pixel point is calculated through a formula: $c=A*abs(d_0-d)$, where abs is an absolute value function, A is an aperture size of the simulated large-aperture lens, $d_0$ is the depth value of the predetermined focusing point, and d is the depth value of the first pixel point.

When d is equal to $d_0$, the first pixel point and the predetermined focusing point are at the same length, the blurring radius c is equal to 0, and thus the first pixel pint requires no blurring. When d is not equal to $d_0$, the first pixel point is far away from the predetermined focusing point, and the closer the distance, the smaller the blurring radius c, and the further the distance, the greater the blurring radius c. That is, in the first image, the predetermined focusing point is not blurred; during blurring, the blurring degree of a focusing area neighboring to the predetermined focusing point is small; and during blurring, the blurring degree of an area away from the predetermined focusing point is great, and the further the distance, the greater the blurring degree.

In an optional example, the operation S250 may be performed by a processor by invoking a corresponding instruction stored in a memory, and may also be performed by a second determining unit 362 in the second acquiring module 360 run by the processor.

In step S260, a second image of which pixel points correspond to those of a first image to be processed and pixel values are initial values is generated.

According to one or more embodiments of the present disclosure, the second image which has the same size as the first image and pixel points have one-to-one correspondence to the first pixel points in the first image is generated according to the acquired first image to be processed, and the pixel values of the second pixel points in the second image are initialized to be 0. Here both the first pixel points and the second pixel points can be represented by coordinates (x, y) because the first image and the second image have equal size and the first pixel points and the second pixel points have one-to-one correspondence.

It should be noted here that in practical disclosure, the step S260 can be executed first to generate the second image, and then the steps S210 to S250 are executed to acquire the blurring desired data of the first image.

In an optional example, the operation S260 may be performed by a processor by invoking a corresponding instruction stored in a memory, and may also be performed by a generating module 310 run by the processor.

In step S270, an initial blurring weight value of the corresponding pixel point is separately determined according to blurring desired data of each first pixel point in the first image.

In an optional implementation, the respective initial blurring weight value w(x, y) is separately determined for each second pixel point (x, y) in the second image according to a formula: $w(x, y)=1/c(x, y)^2$, where c(x, y) is the blurring radius of a first pixel point (x, y). That is, the greater the blurring radius of the first pixel point, the smaller the initial blurring weight value of the corresponding second pixel point.

In an optional example, the operation S270 may be performed by a processor by invoking a corresponding instruction stored in a memory, and may also be performed by a determining module 320 run by the processor.

In step S280, at least one update is performed on at least one second pixel point of the second image.

The update includes: updating, according to a pixel value of a first pixel point and a current blurring weight value of a second pixel point corresponding to the first pixel point, a current pixel value and a current blurring weight value of at least one neighboring second pixel point of the corresponding second pixel point.

In this embodiment, a distance between the neighboring second pixel point and the corresponding second pixel point meets a set requirement. According to one or more embodiments of the present disclosure, the set requirement is that the distance is smaller than or equal to the blurring radius, that is, the blurring radius of the first pixel point is greater than the distance between the corresponding second pixel point and the neighboring second pixel points.

During execution of the step, the scattering operation is performed on multiple neighboring second points (x', y') corresponding to each second pixel point (x, y) in the second image, so as to update the current pixel value I(x', y') and the current blurring weight value w(x', y'). For example, new I(x', y') is acquired by accumulating I(x', y')*w(x, y) on the basis of I(x', y'), to update the current pixel value once; and new w(x', y') is acquired by accumulating w(x, y) on the basis of w(x', y'), to update the current blurring weight value once.

The second image is updated by continuously updating the current pixel value and the current blurring weight value of each second pixel point until all the second pixel points are updated.

In an optional example, the operation S280 may be performed by a processor by invoking a corresponding instruction stored in a memory, and may also be performed by an updating module 330 run by the processor.

In step S290, the pixel value of each second pixel point in the second image is normalized according to the current pixel value and the current blurring weight value of each second pixel point in the updated second image, and the normalized second image is used as the blurring result.

In this embodiment, the current pixel value of each second pixel point is normalized according to the updated current pixel value and current blurring weight value of each second pixel point, so as to acquire the pixel value of each second pixel point. That is, the pixel value of a second pixel point is the ratio of the updated current pixel value to the updated current blurring weight value. Each acquired pixel value is determined as the pixel value of each second pixel point in the second image, and the processed second image is determined as the blurring result of the first image.

In an optional example, the operation S290 may be performed by a processor by invoking a corresponding instruction stored in a memory, and may also be performed by a blurring module 340 run by the processor.

Figure 6:
FIG. 6 is a blurred main image provided according to another embodiment of the present disclosure.

Referring to the blurred main image in FIG. 6, the blurred main image has an obvious blurring effect. The focusing area (the focusing area is the face area of the toy doll at the left side) in FIG. 6 is not blurred or has a small blurring degree, and thus can be clearly displayed; and as the distance increases, the blurring degrees of the pixel points distant from the focusing area become greater and greater, and the pixel points are thus displayed more and more blurrily.

According to the image blurring method of the embodiments of the present disclosure, by acquiring depth data and depth confidence degree data of a first image to be processed, and de-noising the depth data according to the depth confidence degree data, the accuracy of the depth data of the first image is effectively improved and thus the accuracy of acquiring blurring desired data according to the depth data is ensured; and by generating, for the first image to be processed, a second image having corresponding pixel values, determining blurring weight values of pixel points in the second image according to the blurring desired data of the first image, performing cumulative update on the pixel values and the blurring weight values of the pixel points in the second image, and determining a blurring result of the first image according to the update result to simulate the blurring process of a large-aperture lens, the blurring of the first image implemented and the first image can yield an obvious blurring effect.

In practical disclosures, the image blurring method of this embodiment can be implemented by a camera, image processing programs, or an intelligent terminal having a camera function, etc. However, persons skilled in the art should know that in practical disclosures, any device that has corresponding image processing and data processing functions can implement the image blurring method of the embodiments of the present disclosure with reference to this embodiment.

Alternatively, any image blurring method provided in the embodiments of the present disclosure may be executed by a processor, for example, any image blurring method mentioned in the embodiments of the present disclosure is executed by the processor by invoking corresponding instructions stored in a memory. Details are not described below again.

Persons of ordinary skill in the art may understand that all or some steps for implementing the embodiments of the foregoing method may be achieved by a program by instructing related hardware; the foregoing program can be stored in a computer readable storage medium; when the program is executed, steps including the embodiments of the foregoing method are executed. Moreover, the foregoing storage medium includes various media capable of storing program codes such as ROM, RAM, a magnetic disk, or an optical disk.

Figure 7:
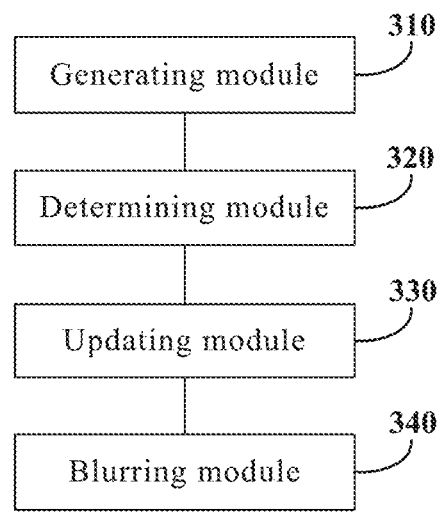
FIG. 7 is a logic block diagram of an image blurring apparatus according to an embodiment of the present disclosure.

FIG. 7 is a logic block diagram of an image blurring apparatus according to an embodiment of the present disclosure. Persons skilled in the art can understand that the term "module" or "unit" in the embodiments of the present disclosure may separately refer to a software module or unit such as "a program module" or "a program unit", and may also separately refer to a module or unit formed by hardware, firmware, or any form of software, hardware, and firmware. No limitation is made thereto in the embodiments of the present disclosure. Details are not described below again.

Referring to FIG. 7, the image blurring apparatus of this embodiment includes a generating module 310, a determining module 320, an updating module 330, and a blurring module 340.

The generating module 310 is configured to generate a second image of which pixel points correspond to those of a first image to be processed and pixel values are initial values; the determining module 320 is configured to separately determine, according to blurring desired data of each first pixel point in the first image, an initial blurring weight value of the corresponding pixel point; the updating module 330 is configured to perform at least one update on at least one second pixel point of the second image, the update including: updating, according to a pixel value of a first pixel point and a current blurring weight value of a second pixel point corresponding to the first pixel point, a current pixel value and a current blurring weight value of at least one neighboring second pixel point of the corresponding second pixel point; and the blurring module 340 is configured to obtain a blurring result of the first image according to the updated second image.

The image blurring apparatus of this embodiment is configured to implement the corresponding image blurring method in the forgoing method embodiments, and has the beneficial effects of the corresponding method embodiment. Details are not described below again.

Figure 8:
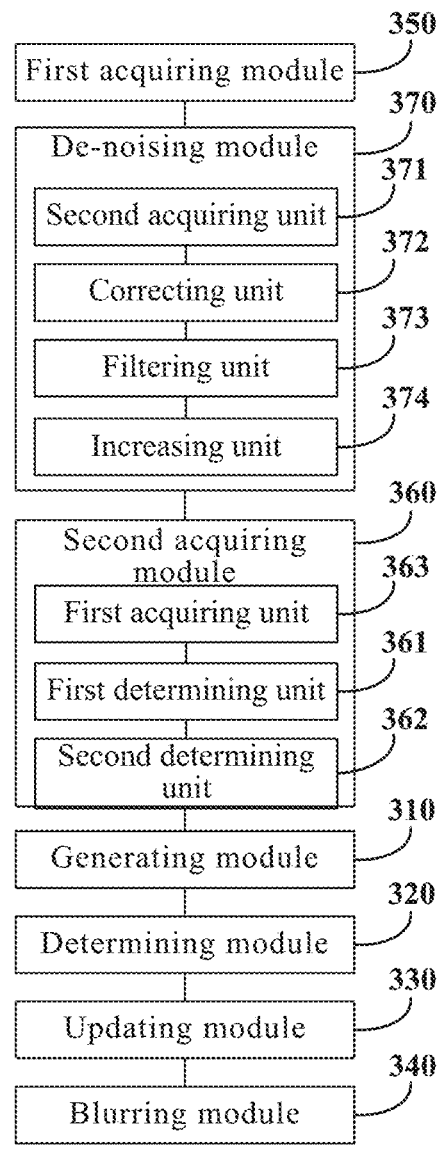
FIG. 8 is a logic block diagram of an image blurring apparatus according to another embodiment of the present disclosure.

FIG. 8 is a logic block diagram of an image blurring apparatus according to another embodiment of the present disclosure.

According to the image blurring apparatus of this embodiment, a distance between the neighboring second pixel point and the corresponding second pixel point meets a set requirement.

In an optional implementation, the blurring desired data of the first pixel point includes: a blurring radius; and a distance between the neighboring second pixel point and the corresponding second pixel point meeting a set requirement includes: the distance between the neighboring second pixel point and the corresponding second pixel point is smaller than or equal to the blurring radius.

In an optional implementation, the blurring module 340 is configured to normalize, according to a current pixel value and a current blurring weight value of each second pixel point in the updated second image, the pixel value of each second pixel point in the second image, and use the normalized second image as the blurring result.

According to one or more embodiments of the present disclosure, the image blurring apparatus of this embodiment further includes: a first acquiring module 350 configured to acquire depth data corresponding to the first image; and a second acquiring module 360 configured to acquire the blurring desired data of each first pixel point in the first image according to the depth data.

According to one or more embodiments of the present disclosure, the second acquiring module 360 includes: a first determining unit 361 configured to determine a depth difference value between each first pixel point in the first image and a predetermined focusing point in the first image according to the depth data; and a second determining unit 362 configured to separately determine the blurring desired data of each first pixel point according to each depth difference value.

According to one or more embodiments of the present disclosure, the second acquiring module 360 further includes: a first acquiring unit 363 configured to acquire input focusing point information.

According to one or more embodiments of the present disclosure, the image blurring apparatus of this embodiment further includes: a de-noising module 370 configured to de-noise the depth data.

According to one or more embodiments of the present disclosure, the first image is a main image obtained by photographing the same object with a dual-lens camera; and the de-noising module 370 includes: a second acquiring unit 371 configured to obtain the depth data and depth confidence degree data according to the main image and a secondary image obtained by photographing the same object with the dual-lens camera, the depth data indicating depth values of corresponding pixel points in the main image and the secondary image, and the depth confidence degree data indicating confidence degrees of the depth values in the depth data; and a correcting unit 372 configured to correct at least one depth value in the depth data according to the depth confidence degree data.

According to one or more embodiments of the present disclosure, the second acquiring unit 371 includes a first sub-unit (not shown) configured to, if the corresponding pixel points in the main image and the secondary image have the same depth value, assign a depth confidence degree value greater than a reference value to the corresponding pixel points; and/or, if the depth value of the pixel points in the main image exceeds a preset range, assign a depth confidence degree value smaller than the reference value to the pixel points exceeding the preset range; and/or, if the pixel points in the main image have two or more depth values, assign depth confidence degree values smaller than the reference value to the pixel points having two or more depth values.

According to one or more embodiments of the present disclosure, the correcting unit 372 is configured to replace the depth value of a pixel point having the minimum depth confidence degree value with the depth value of a neighboring pixel point having the maximum depth confidence degree value.

According to one or more embodiments of the present disclosure, the de-noising module 370 further includes: a filtering unit 373 configured to filter the depth data by using a filter; and/or, an increasing unit 374 configured to increase the depth values in the depth data according to a preset proportion.

According to one or more embodiments of the present disclosure, the second acquiring unit 371 includes: a second sub-unit (not shown) configured to perform stereo matching on the main image and the secondary image to obtain initial depth data; and a third sub-unit configured to perform depth calibration on the initial depth data to position the corresponding pixel points of the main image and the secondary image at the same depth to obtain the depth data.

The image blurring apparatus of this embodiment is configured to implement the corresponding image blurring method in the forgoing method embodiments, and has the beneficial effects of the corresponding method embodiment. Details are not described below again.

Figure 9:
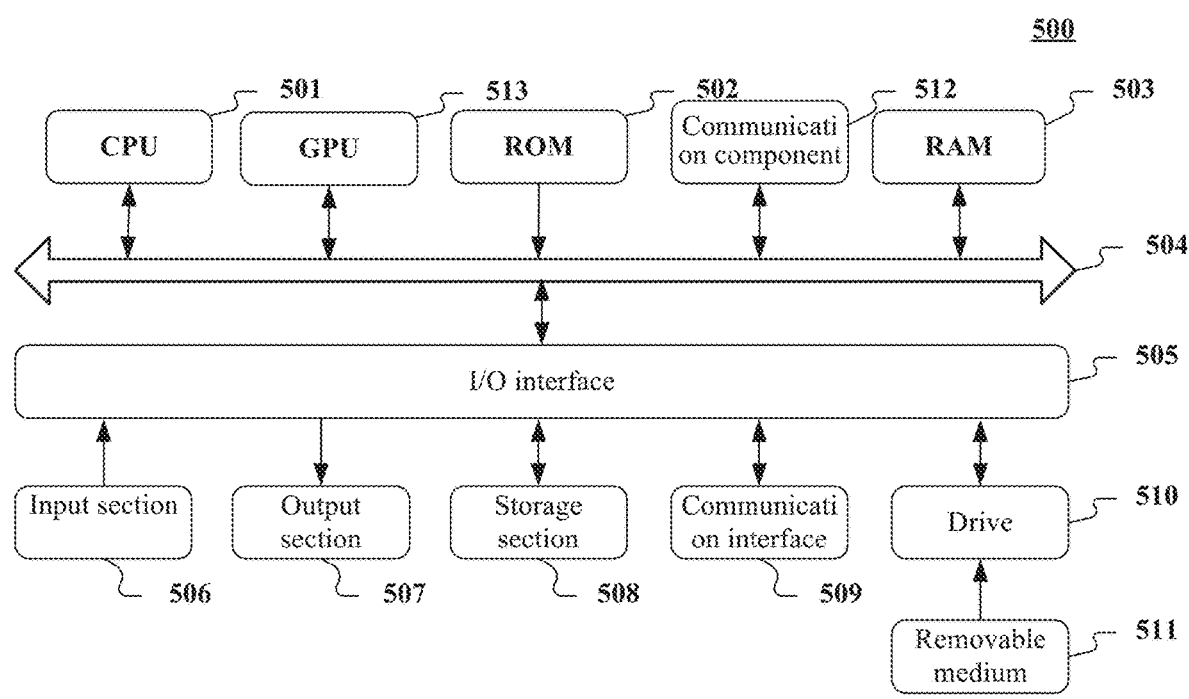
FIG. 9 is a structural schematic diagram of an electronic device according to an embodiment of the present disclosure.

The embodiments of the present disclosure further provide an electronic device which, for example, may be a mobile terminal, a Personal Computer (PC), a tablet computer, a server, and the like. Referring to FIG. 9 below, a schematic structural diagram of an electronic device 500 suitable for implementing a terminal device or a server according to the embodiments of the present disclosure is shown.

As shown in FIG. 9, the electronic device 500 includes one or more processors, a communication element, and the like. The one or more processors are, for example, one or more Central Processing Units (CPUs) 501 and/or one or more Graphic Processing Units (GPUs) 513, and the processors may execute an appropriate action and processing according to an executable instruction stored in a Read-Only Memory (ROM) 502 or an executable instruction loaded from a storage section 508 to a Random Access Memory (RAM) 503. The communication element includes a communication component 512 and a communication interface 509. The communication component 512 may include, but is not limited to, a network card, and the network card may include, but is not limited to, an InfiniBand (TB) network card. The communication interface 509 includes a communication interface of a network interface card such as a LAN card and a modem, and the communication interface 509 performs communication processing via a network such as the Internet.

The processors may communicate with the ROM 502 and/or the RAM 503 to execute the executable instruction, and may be connected to the communication component 512 by means of a bus 504 and thus communicate with other target devices by means of the communication component 512, so as to complete the corresponding operations of any method provided by the embodiments of the present disclosure, for example, generating a second image of which pixel points correspond to those of a first image to be processed and pixel values are initial values; separately determining, according to blurring desired data of each first pixel point in the first image, an initial blurring weight value of the corresponding pixel point; performing at least one update on at least one second pixel point of the second image, the update including: updating, according to a pixel value of a first pixel point and a current blurring weight value of a second pixel point corresponding to the first pixel point, a current pixel value and a current blurring weight value of at least one neighboring second pixel point of the corresponding second pixel point; and obtaining a blurring result of the first image according to the updated second image.

In addition, the RAM 503 may further store various programs and data required for operations of an apparatus. The CPU 501, the ROM 502, and the RAM 503 are connected to each other via the bus 504. In the presence of the RAM 503, the ROM 502 is an optional module. The RAM 503 stores executable instructions, or writes the executable instructions into the ROM 502 during running, where the executable instructions cause the CPU 501 to execute corresponding operations of the foregoing communication method. An input/output (I/O) interface 505 is also connected to the bus 504. The communication component 512 may be integrated, or may be configured to have a plurality of sub-modules (for example, a plurality of IB network cards) linked on the bus.

The following parts are connected to the I/O interface 505: an input section 506 including a keyboard, a mouse and the like; an output section 507 including a Cathode-Ray Tube (CRT), a Liquid Crystal Display (LCD), a loudspeaker and the like; a storage section 508 including hardware and the like; and the communication interface 509 of a network interface card such as a LAN card and a modem. A drive 510 is also connected to the I/O interface 505 according to needs. A removable medium 511 such as a magnetic disk, an optical disk, a magneto-optical disk, a semiconductor memory or the like is mounted on the drive 510 according to needs, so that a computer program read from the removable medium 511 may be installed on the storage section 508 according to needs.

It should be noted that the architecture illustrated in FIG. 9 is merely an optional implementation. During practice, the number and types of the parts in FIG. 9 may be selected, decreased, increased, or replaced according to actual requirements. Different functional parts may be separated or integrated or the like. For example, the GPU 513 and the CPU 501 may be separated, or the GPU 513 may be integrated on the CPU 501, and the communication component 512 may be separated from or integrated on the CPU 501 or the GPU 513 or the like. These alternative implementations all fall within the scope of protection of the present disclosure.

Particularly, the process described above with reference to the flowchart according to the embodiment of the present disclosure may be implemented as a computer software program. For example, the embodiments of the present disclosure include a computer program product, including a computer program tangibly included on a machine readable medium. The computer program includes program codes for executing the method shown in the flowchart. The program codes may include corresponding instructions for correspondingly executing the steps of the method provided by the embodiments of the present disclosure, for example, generating a second image of which pixel points correspond to those of a first image to be processed and pixel values are initial values; separately determining, according to blurring desired data of each first pixel point in the first image, an initial blurring weight value of the corresponding pixel point; performing at least one update on at least one second pixel point of the second image, the update including: updating, according to a pixel value of a first pixel point and a current blurring weight value of a second pixel point corresponding to the first pixel point, a current pixel value and a current blurring weight value of at least one neighboring second pixel point of the corresponding second pixel point; and obtaining a blurring result of the first image according to the updated second image. In such embodiments, the computer program may be downloaded from a network by means of the communication element and installed, and/or be installed from the removable medium 511. The computer program, when being executed by the CPU 501, executes the foregoing functions defined in the method of the embodiments of the present disclosure.

The embodiments in the specification are all described in a progressive manner, for same or similar parts in the embodiments, refer to these embodiments, and each embodiment focuses on a difference from other embodiments. The system disclosed in the embodiments corresponds to the method disclosed in the embodiments, and therefore is described relatively simply. For related parts, reference may be made to related descriptions of the method embodiments.

The methods, apparatuses, and devices in the present disclosure may be implemented in many manners. For example, the methods, apparatuses, and devices in the present disclosure may be implemented with software, hardware, firmware, or any combination of software, hardware, and firmware. The foregoing sequence of the steps of the method is merely for description, and unless otherwise stated particularly, the steps of the method in the present disclosure are not limited to the described sequence. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe the principles and actual disclosures of the present disclosure, and to enable persons of ordinary skill in the art to understand the present disclosure, so as to design various embodiments with various modifications suitable for particular use.

The descriptions above only involve implementations of the embodiments of the present disclosure. However, the scope of protection of the embodiments of the present disclosure is not limited thereto. Within the technical scope disclosed by the embodiments of the present disclosure, any variation or substitution that can be easily conceived of by persons skilled in the art should all be included within the scope of protection of the embodiments of the present disclosure. Therefore, the scope of protection of the embodiments of the present disclosure should be defined by the scope of protection of the claims.

The term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C." As another example, if a method comprises steps "A and/or B and/or C" then the method is to be interpreted as covering all the following individual steps and combinations of steps: "A"; "B"; "C"; "A and B"; "A and C"; "B and C"; and "A, B, and C."

What is claimed is:

1. An image blurring method, comprising:
   generating a second image comprising second pixel points, the second pixel points corresponding to first pixel points of a first image to be processed and having second pixel values being initial values;
   determining, according to blurring desired data of the first pixel points in the first image, respective initial blurring weight values of the corresponding second pixel points;
   performing at least one update on at least one of the second pixel points of the second image, the update comprising: updating, based on a first pixel value of the first pixel point and a current blurring weight value of the second pixel point corresponding to the based first pixel point, a current pixel value and a current blurring weight value of at least one neighboring second pixel point of the based corresponding second pixel point, wherein a distance between the neighboring second pixel point and the based corresponding second pixel point is smaller than or equal to a blurring radius; and
   obtaining a blurring result of the first image according to the updated second image.

2. The method according to claim 1, wherein the obtaining a blurring result of the first image according to the updated second image comprises:
   normalizing, according to a current pixel value and a current blurring weight value of each second pixel point in the updated second image, the pixel value of each second pixel point in the second image, and using the normalized second image as the blurring result.

3. The method according to claim 1, further comprising:
   acquiring depth data corresponding to the first image; and
   acquiring the blurring desired data of each first pixel point in the first image according to the depth data.

4. The method according to claim 3, wherein the acquiring the blurring desired data of each first pixel point in the first image according to the depth data comprises:
   determining a depth difference value between each first pixel point in the first image and a predetermined focusing point in the first image according to the depth data; and
   determining the blurring desired data of each first pixel point according to each depth difference value respectively.

5. The method according to claim 4, further comprising, before determining the depth difference value between each first pixel point and the predetermined focusing point in the first image according to the depth data:
   acquiring input focusing point information.

6. The method according to claim 3, further comprising, before acquiring the blurring desired data of each first pixel point in the first image according to the depth data:
   de-noising the depth data.

7. The method according to claim 6, wherein the first image is a main image obtained by photographing the same object with dual cameras; and the de-noising the depth data comprises:
   obtaining the depth data and depth confidence degree data according to the main image and a secondary image obtained by photographing the same object with the dual cameras, the depth data indicating depth values of corresponding pixel points in the main image and the secondary image, and the depth confidence degree data indicating confidence degrees of the depth values in the depth data; and
   correcting at least one depth value in the depth data according to the depth confidence degree data.

8. The method according to claim 7, wherein the obtaining depth confidence degree data according to the main image and a secondary image obtained by photographing the same object with the dual cameras comprises:
   if the corresponding pixel points in the main image and the secondary image have the same depth value, assigning a depth confidence degree value greater than a reference value to the corresponding pixel points; and/or,
   if the depth value of the pixel points in the main image exceeds a preset range, assigning a depth confidence degree value smaller than the reference value to the pixel points exceeding the preset range; and/or,
   if the pixel points in the main image have two or more depth values, assigning depth confidence degree values smaller than the reference value to the pixel points having two or more depth values.

9. The method according to claim 7, wherein the correcting at least one depth value in the depth data according to the depth confidence degree data comprises:
   replacing the depth value of a pixel point having the minimum depth confidence degree value with the depth value of a neighboring pixel point having the maximum depth confidence degree value.

10. The method according to claim 6, wherein the de-noising the depth data further comprises:
    filtering the depth data by using a filter; and/or,
    increasing the depth values in the depth data according to a preset proportion.

11. The method according to claim 7, wherein the obtaining the depth data according to the main image and a secondary image obtained by photographing the same object with the dual-lens camera comprises:
    performing stereo matching on the main image and the secondary image to obtain initial depth data; and
    performing depth calibration on the initial depth data to position the corresponding pixel points of the main image and the secondary image at the same depth to obtain the depth data.

12. An image blurring apparatus, comprising:
    a processor, and a memory storing instructions, wherein the instructions, when executed by the processor, cause the processor to perform operations, the operations comprising:
    generating a second image comprising second pixel points, the second pixel points corresponding to first pixel points of a first image to be processed and having second pixel values being initial values;
    determining, according to blurring desired data of the first pixel points in the first image, respective initial blurring weight values of the corresponding second pixel points;
    performing at least one update on at least one of the second pixel points of the second image, the update comprising: updating, based on a first pixel value of the first pixel point and a current blurring weight value of the second pixel point corresponding to the based first pixel point, a current pixel value and a current blurring weight value of at least one neighboring second pixel point of the based corresponding second pixel point, wherein a distance between the neighboring second pixel point and the based corresponding second pixel point is smaller than or equal to a blurring radius; and
    obtaining a blurring result of the first image according to the updated second image.

13. The apparatus according to claim 12, wherein the obtaining a blurring result of the first image according to the updated second image comprises:
    normalizing, according to a current pixel value and a current blurring weight value of each second pixel point in the updated second image, the pixel value of each second pixel point in the second image, and using the normalized second image as the blurring result.

14. The apparatus according to claim 12, the operations further comprising:
    acquiring depth data corresponding to the first image; and
    acquiring the blurring desired data of each first pixel point in the first image according to the depth data.

15. The apparatus according to claim 14, wherein the acquiring the blurring desired data of each first pixel point in the first image according to the depth data comprises:
    determining a depth difference value between each first pixel point in the first image and a predetermined focusing point in the first image according to the depth data; and
    determining the blurring desired data of each first pixel point according to each depth difference value respectively.

16. The apparatus according to claim 15, wherein the operations further comprise:
    before determining the depth difference value between each first pixel point and the predetermined focusing point in the first image according to the depth data,
    acquiring input focusing point information; and
    before acquiring the blurring desired data of each first pixel point in the first image according to the depth data,
    de-noising the depth data,
    wherein the first image is a main image obtained by photographing the same object with dual cameras; and the de-noising the depth data comprises:

obtaining the depth data and depth confidence degree data according to the main image and a secondary image obtained by photographing the same object with the dual cameras, the depth data indicating depth values of corresponding pixel points in the main image and the secondary image, and the depth confidence degree data indicating confidence degrees of the depth values in the depth data; and correcting at least one depth value in the depth data according to the depth confidence degree data.

17. A non-transitory storage medium having at least one executable instruction stored therein, wherein the executable instruction is adapted to be loaded by a processor and execute operations, the operations comprising:

generating a second image comprising second pixel points, the second pixel points corresponding to first pixel points of a first image to be processed and having second pixel values being initial values;

determining, according to blurring desired data of the first pixel points in the first image, respective initial blurring weight values of the corresponding second pixel points;

performing at least one update on at least one of the second pixel points of the second image, the update comprising: updating, based on a first pixel value of the first pixel point and a current blurring weight value of the second pixel point corresponding to the based first pixel point, a current pixel value and a current blurring weight value of at least one neighboring second pixel point of the based corresponding second pixel point, wherein a distance between the neighboring second pixel point and the based corresponding second pixel point is smaller than or equal to a blurring radius; and obtaining a blurring result of the first image according to the updated second image.

* * * * *